H. H. JACKSON.
FRUIT SEPARATOR.
APPLICATION FILED JULY 11, 1918.
1,295,172.
Patented Feb. 25, 1919.
3 SHEETS—SHEET 2.
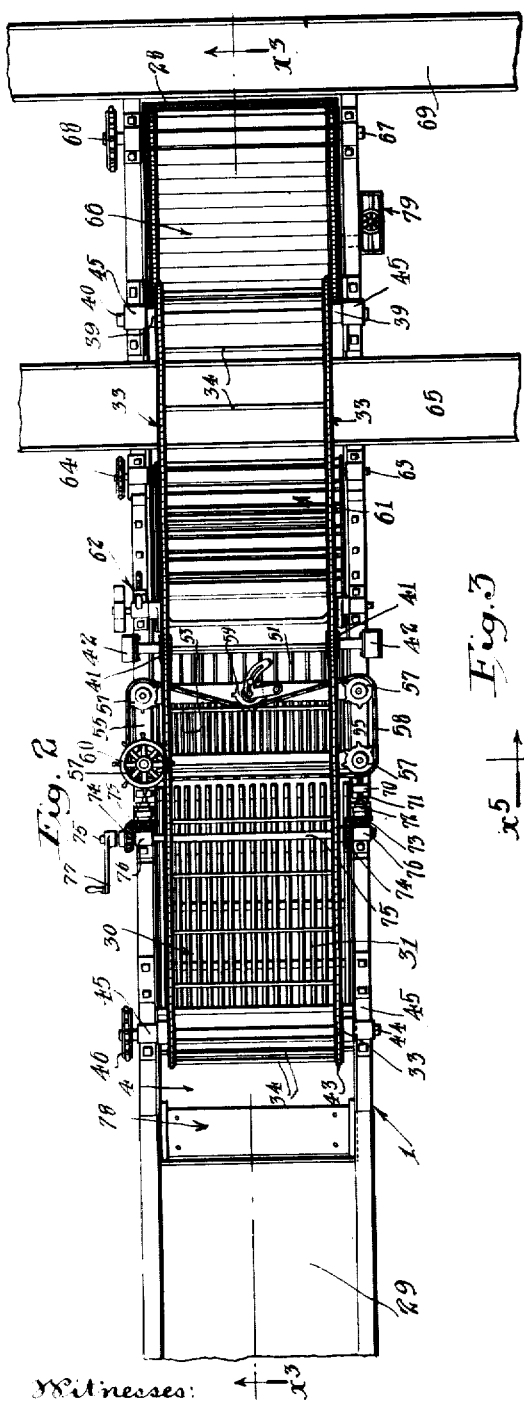
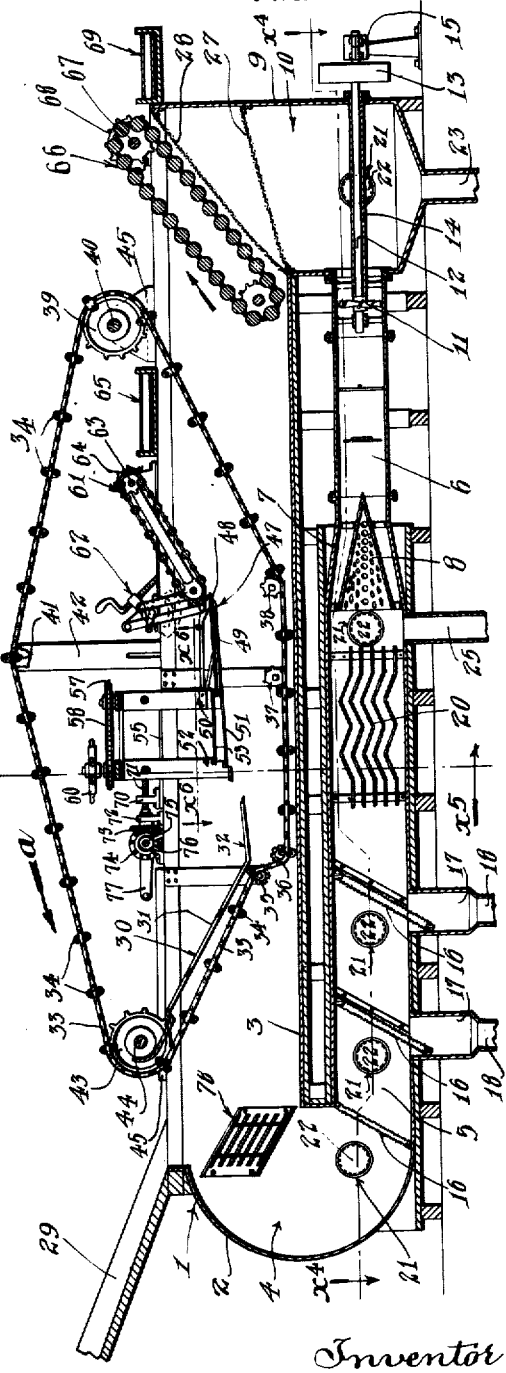
Fig. 2
Fig. 3
Witnesses:
Inventor
Hugh H. Jackson
By Frederick S. Lyon atty.

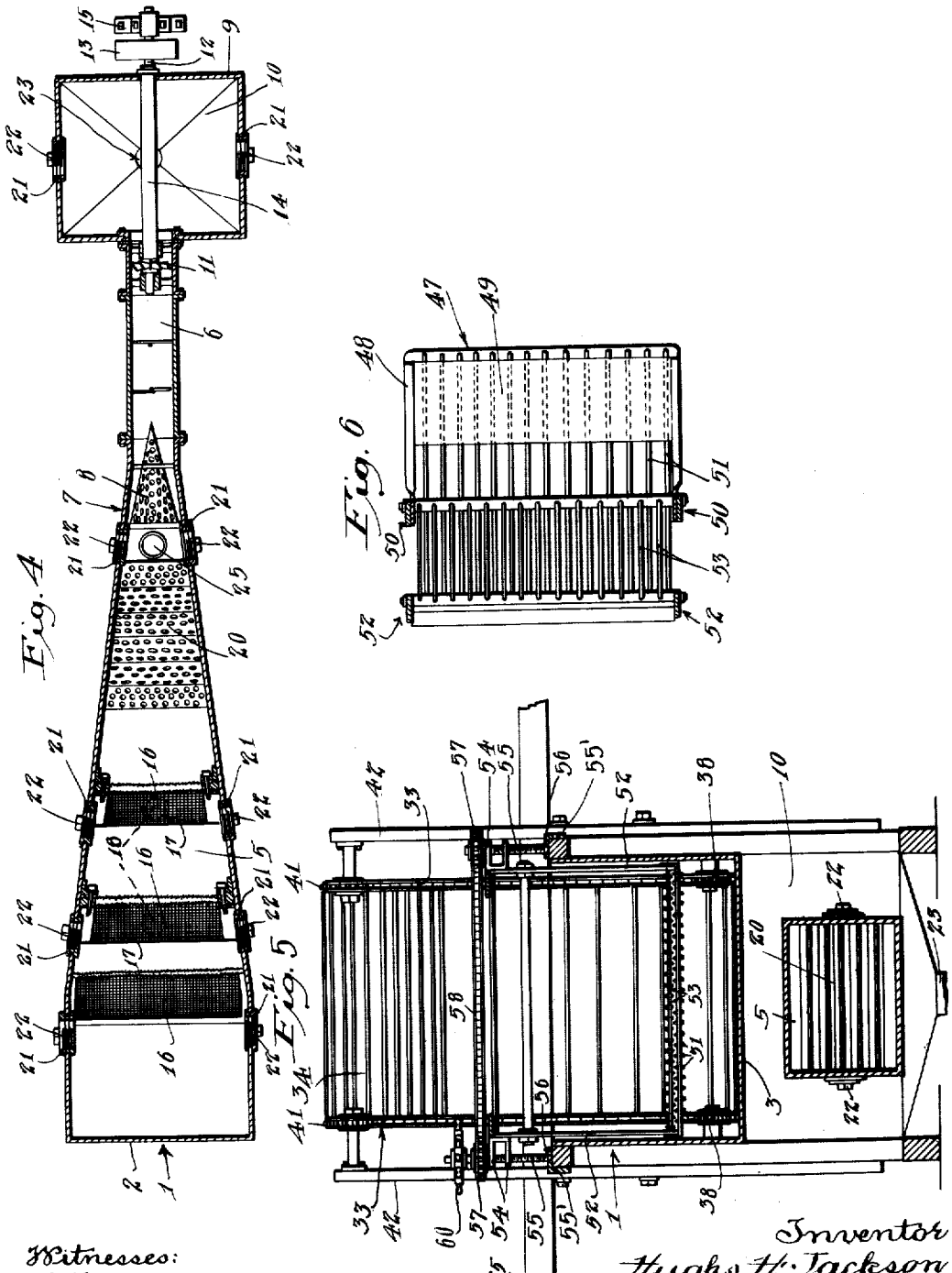

UNITED STATES PATENT OFFICE.

HUGH H. JACKSON, OF LOS ANGELES, CALIFORNIA, ASSIGNOR TO WEST HIGHLANDS CITRUS ASSOCIATION, OF WEST HIGHLANDS, CALIFORNIA, A CORPORATION OF CALIFORNIA.

FRUIT-SEPARATOR.

1,295,172.  Specification of Letters Patent.  Patented Feb. 25, 1919.

Application filed July 11, 1918. Serial No. 244,362.

*To all whom it may concern:*

Be it known that I, HUGH H. JACKSON, a citizen of the United States, residing at Los Angeles, in the county of Los Angeles and State of California, have invented a new and useful Fruit-Separator, of which the following is a specification.

This invention pertains to fruit separators of the character employing a liquid, such as water, the fruit being discharged from a given level in the water and a current being set up so that the fruit will be separated in accordance with its angle of rise from the level of release of the fruit, the angle of rise depending upon the rate of flow of the current and the specific gravity of the fruit bodies.

An object of the invention is to make provision for insuring against the fruit bodies interfering with one another when they are released, such interference when not prevented resulting in inaccuracy in separating the fruit bodies of different specific gravities from one another.

Another object of the invention is to make provision for creating a current of water that is uniform from side to side of the tank of the separator and one which is not cut up and disturbed by minor currents.

Another object of the invention is to effect the foregoing by a practical construction.

Other objects and advantages will appear in the subjoined detailed description.

The accompanying drawings illustrate the invention:

Fig. 2 is a plan view of Fig. 1.

Fig. 3 is an elevation mainly in section on line indicated by $x^3$—$x^3$, Fig. 2.

Fig. 4 is a plan section on line indicated by $x^4$—$x^4$, Fig. 3.

Fig. 5 is an enlarged transverse sectional elevation on line indicated by $x^5$—$x^5$, Fig. 3.

Fig. 6 is a fragmental plan of the adjustable apron or separating member.

Figure 1:
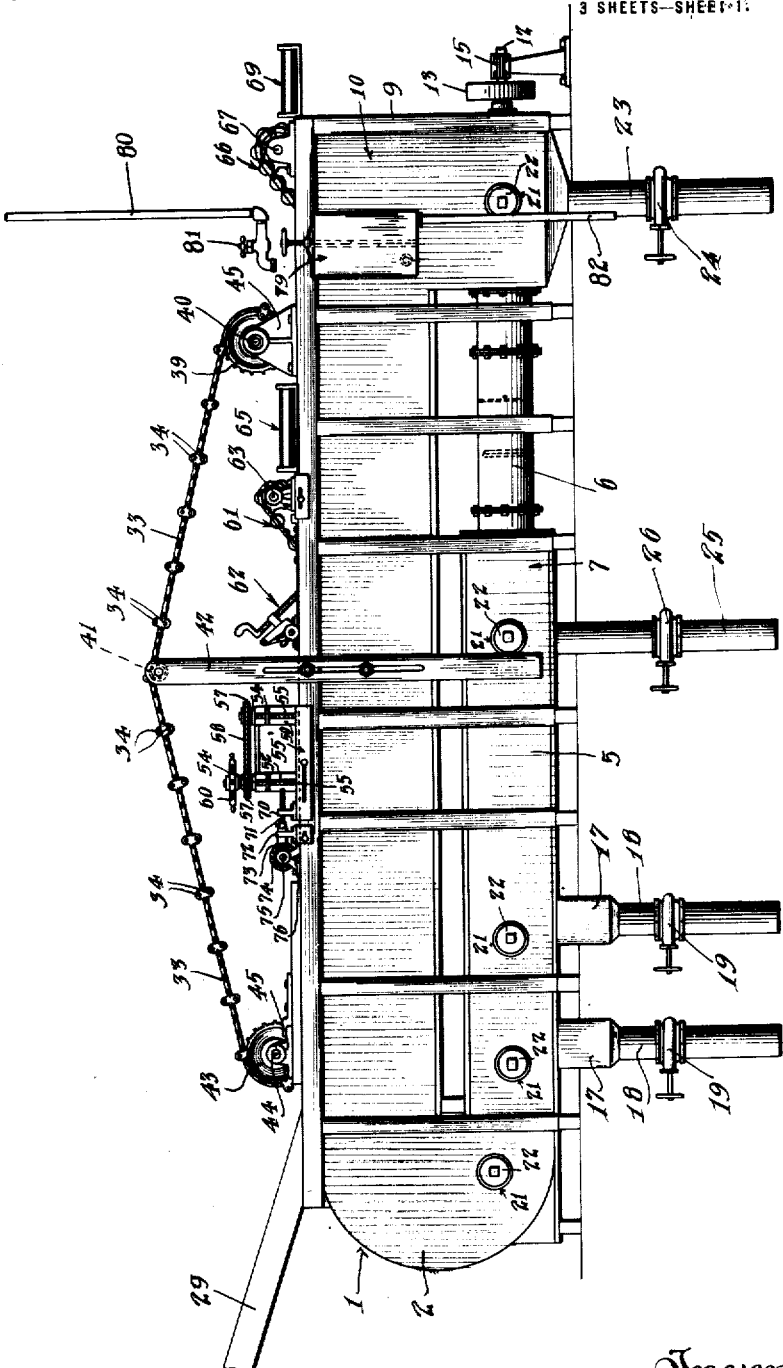
Figure 1 is a side elevation of a fruit separator embodying the invention.

There is provided a tank 1 of any suitable construction. In the instance shown in the drawings the tank is substantially rectangular and has its forward or feed end of concave form outwardly, as indicated at 2, the purpose for which will appear hereinafter. The floor of the tank is indicated at 3 and said floor is spaced from the curved end 2 so as to form an inlet 4 therebetween extending the full width of the tank. Discharging into the inlet 4 toward the lower end of the concave wall 2 is a forwardly expanding passage 5. The intake end of the passage 5 communicates with a pipe 6 which has a forwardly expanding discharge mouth 7 discharging into the passage 5. Inserted in the expanding mouth 7 with its apex pointed rearward is a perforate cone 8.

The floor 3 is spaced from the rear end wall 9 of the tank to form an outlet 10 therebetween extending the full width of the tank, said outlet being in the form of a well from which the intake end of the tube 6 leads. Inserted in the intake end of the tube 6 is a pump which may be in the form of a screw propeller 11 mounted on a shaft 12 that may be driven by a suitable pulley 13 adapted to be belted to any suitable source of power. The shaft 12 is journaled in the well 10 in a sleeve 14 which extends across the well and the outer end of said shaft is supported in a bearing 15. Driving of the propeller 11 draws water from the well 10 into the tube 6 and thus sets up a circulation of water in the tank 1 so as to produce a rearwardly flowing current in the tank. It is clear that the current of water is broken up to some extent by the perforate cone 8 as the water flows from the tube 6 into the passage 5 and to still further break up the minor currents and eddies in the water, that tend to be produced by the pump 11, I have provided in the passage 5 a series of screens 16 which in the instance shown are arranged in pairs. Each pair of screens 16 is preferably set aslant and all but one pair of the screens are arranged above wells 17 from which discharge pipes 18 controlled by valves 19. The screens 16 extend substantially the full width of the tank.

Between the screens 16 and the cone 8 inside of the passage 5 is a series of zigzag baffles 20 which are preferably perforate as shown.

At intervals along both sides of the tank there are provided ports 21 normally closed by covers 22. There is one of these ports 21 adjacent each pair of screens 16 and there is another of these ports adjacent the cone 8 and baffles 20. Also there is another of the ports 21 opening into the well 10. A pipe 23 discharges downward from the well 10 and is controlled by a valve 24. Another pipe 25 discharges from adjacent the cone 8 and baffles 20 and is provided with a valve 26.

The well 10 is preferably provided with a perforate cover which may be in the form of a screen 27 and still another screen 28 may be arranged at the rear end of the tank over the screen 27 and extending aslant from the tank bottom 3 to the upper edge of the rear wall 9 of the tank.

The water in circulating passes from the rear of the tank 1 through the screen 28, thence through the screen 27 into the well 10, thence into the tube 6 and from said tube through the perforate cone 8. From the cone 8 the water flows between adjacent baffles 20 thence through the successive pairs of screens 16 and by way of the inlet 4 to the front of the tank. When the water passes from the last pair of screens 16 the current produced by the pump 11 has been made perfectly smooth and uniform throughout its cross-sectional area and the current is reversed by the concave wall 2 and flows evenly rearward so that the current at any given point above the bottom 3 is of uniform speed from side to side of the tank and from the bottom of the tank to the surface of the water.

It is essential that the current be absolutely uniform from end to end of the tank 1 and that in so far as possible all minor currents and eddies be eliminated and the foregoing described construction of the forwardly expanding passage 5, cone 8, screens 16, and baffles 20 is for effecting this.

It is clear that to clean out the tank, passage 5, tubes 6 and well 10, and to clean off the screens 16, all that is necessary is to open the valves 19, 24, 26, then to remove the port covers 22 and insert hose through the ports and direct the stream of water upon and through the screens 16, baffles 20, cone 8 and bottom of the well 10 so as to wash out all sediment deposited from fruit passing through the separator. It is understood, however, that it is preferable to thoroughly wash the fruit before it passes through the separator so that there will be a minimum amount of sediment deposited in the separator. When the fruit is washed first, it will pass directly from the separator to some suitable form of drier before it is packed for shipment.

The front or feed end of the tank is preferably provided with a feed chute 29 whereby the fruit bodies are fed to the tank. Near the feed end of the tank there is provided a fruit submerging member 30 which may be composed of a series of parallel slats as indicated in the drawings. A portion of the fruit submerging member 30 extends downwardly and rearwardly aslant and another portion of said member extends upwardly and rearwardly aslant.

In the types of fruit separators heretofore invented, the current of water was depended upon for carrying the fruit rearward beneath the fruit submerging member 30 and consequently the fruit bodies were released from the rearward end of the fruit submerging member 30 so close together that they interfered with one another causing inaccuracy in the grading or separating of the fruit. To overcome this difficulty, that is to prevent interference of the fruit bodies with one another during their rise after being released from the submerging member 30, I have provided an endless submerging conveyer comprising chains 33 and flights 34 fastened at their ends to the chains. The chains 33 extend beneath and close to the portion 31 of the submerging member, extend over idler sprockets 35, thence downward beneath idler sprockets 36, thence horizontally close to the tank bottom 3 beneath idler sprockets 37, 38, thence aslant forward and upward, thence over sprocket wheels 39 mounted on a shaft 40, thence rearward over idler sprockets 41 of belt tighteners 42, and thence rearwardly over other sprockets 43 mounted on shaft 44. The shafts 40, 44 are suitably journaled in bearings 45 mounted on the upper edges of the tank, and the shaft 44 may be driven by any suitable means, for instance, through the agency of a sprocket wheel 46 which may be connected to any suitable source of power. The endless chains 33 are driven in the direction of the arrow $a$ Fig. 3, and the chains are driven at such a rate of speed as will insure that the fruit bodies will be discharged in successive rows from the portion 32 of the submerging member so that the fruit bodies will not interfere with one another.

Rearward of the submerging member 30 is arranged an apron or separating member 47 that in the instance shown in the drawings comprises a frame 48 on which is mounted a flat member 49 that may be constructed of sheet metal. The frame 48 extends slightly aslant upward and rearward and is suspended or hung from the lower end of an adjustable support in the form of a rectangular frame 50. The frame 48 is connected by rods 51 to the lower end of an adjustable support in the form of a rectangular frame 52 and the frame 50 is connected with the frame 52 by rods 53. This construction insures that the separating member 47 will be held in a nearly horizontal position at all times.

The frames 50, 52 are provided at their upper corners with outwardly extending brackets 54 through which are screw-threaded vertical adjusting screws 55 which bear at their lower ends upon slides 55' shiftable along the upper edges of the tank 1, there being sockets 56 in the slides to accommodate the lower ends of the adjusting screws so as to retain the screws 55 in position on the slides. The upper ends of the screws 55 are provided with sprocket wheels 57 and rove around said sprocket wheels is an endless chain 58, there being a tightening device indicated at 59 which may be of any suitable construction to retain the chain 58 at the desired degree of tautness. On the upper end of one of the screws 55 is a hand-wheel 60 whereby it may be turned, thus causing equal turning of all of the screws 55 so as to adjust the frames 50, 52 equal distances up or down in order to raise or lower the separating member 47.

Extending aslant upward and rearward from adjacent the rear edge of the separating member 47 is an endless conveyer 61, provided at its forward end with adjusting means 62 whereby the forward end of the elevator may be raised and lowered in accordance with the level to which the separating member 47 is adjusted. These adjusting means 62 may be of any suitable construction and need not be described in detail herein since such adjusting means are well-known in the art pertaining to fruit separators and the like. One of the shafts 63 of the conveyer 61 is provided with a sprocket wheel 64 which may be driven from any suitable source of power. The rear end of the conveyer 61 is positioned adjacent a transverse conveyer shown fragmentarily at 65 which may be of the belt type and may be driven by any suitable means, not shown.

Extending aslant upward and rearward just above the screen 28 is an endless conveyer 66, the forward end of said conveyer being adjacent the bottom 3 of the tank and the rear end extending above the edge of the tank adjacent the rear wall 9. One of the shafts 67 of the conveyer 66 is provided with a sprocket wheel 68 whereby said shaft may be driven from any suitable source of power. Extending transversely of the tank 1 adjacent the rear end of the conveyer 66 is a conveyer 69 which may be of the belt type or the like and driven by any suitable means, not shown.

Means are provided to adjust the slides 55' along the tank so as to change the position of the separating member 47 lengthwise of the tank and such means will now be described. Mounted on the slides 55' are lugs 70 through which are screw-threaded horizontal adjusting screws 71. The screws 71 pass through bearings 72 mounted on the upper edges of the tank 1 and said screws are provided at their forward ends with bevel gears 73 meshing with bevel gears 74 which are mounted on a transversely extending shaft 75 journaled in bearings 76 that are mounted on the upper edges of the tank. The shaft 75 is provided at one end with a crank 77 whereby the shaft may be turned so as to effect turning of the screws 70 which thus effect longitudinal adjustment of the separating member 47. Thus it is clear the separating member 47 may be adjusted toward and away from the submerging member 30 by appropriate turning of the crank 77.

In practice, assuming that the tank 1 is filled with water and that power is applied to drive the sprockets 46, 64, 68 and pulley 13, the fruit to be treated in the separator will be fed to the chute 29 and will pass thence into the forward end of the tank 1. The pump 11 will create a rearwardly flowing current of water in the tank and the fruit bodies will be positively carried by the conveyer flights 34 beneath the submerging member 30. The fruit bodies of relatively great specific gravity, when released from the conveyer 33, will not rise in the liquid current sufficiently quick to clear the separating member 47 and consequently will pass beneath the separating member to the conveyer 66 which operates to carry said fruit bodies upward out of the tank and discharge them into the transverse conveyer 69. The fruit bodies that are of relatively light specific gravity, for instance those that have been injuriously acted on by frost, will tend to rise in the current of water as soon as said fruit bodies discharge from the rear end of the submerging member 30 and will be carried by the current of water to position above the separating member 47. These lighter fruit bodies will then be carried by the current into the conveyer 61 and will be elevated by said conveyer and discharged into the transverse conveyer 65.

I am aware that it is not new to employ a current of water and a separating member to effect the separation of fruit bodies of different specific gravities from one another, but by the construction above described, I have effected such refinements in the operation of the separator as are requisite to produce accurate separation. By the construction described the fruit bodies will not interfere with one another when they discharge from beneath the submerging member, since the conveyer 33 separates the fruit bodies, and the current of water will be sufficiently smooth and uniform to insure that the heavier fruit bodies will pass beneath the separating member and the lighter fruit bodies will pass above the separating member.

If it be desired to move the separating member to a different level the hand-wheel 60 will be turned in the appropriate direction and if it be advisable to move the separating member toward or from the submerging member 30 the crank 77 will be turned in the appropriate direction for this purpose. The level to which the separating member 47 will be adjusted relative to the level of the submerging member 30 and also the position horizontally to which the separating member will be adjusted relative to the submerging member is dependent upon the rate of flow of the current of water, and it is noted that the vertical adjustment affects to a like degree all portions of the separating member so that regardless of such adjustment the flow of the water will not be interfered with any more with one position of the separating member than with another position thereof.

The forward end of the tank 1 is preferably provided with a series of spaced superposed baffle plates 78 inclined downwardly and rearwardly so that in operation said baffle plates will direct the current from the curved wall 2 rearward and downward toward the tank bottom 3. This is of importance to insure that the speed of the current below the plane of the submerging member 30 be great enough to carry the heavier fruit beneath the separating member 47 for even the heavier fruit bodies tend to rise very rapidly to the surface of the liquid in the tank.

I have indicated at 79 a device for maintaining the liquid in the tank at a predetermined level.

This device 79 may be of any suitable construction and need not be described in detail herein since it forms no part of this present invention. The device 79 is supplied with water through a pipe 80 having a valve or faucet 81 and an overflow pipe 82 leads from the device.

The movement of the fruit bodies rearward to the lowest submergence level is effected positively by the conveyer 33 so as to prevent crowding of the fruit bodies together as they pass downward beneath the downwardly and rearwardly slanting portion of the submerging member 30; and at the point where the fruit bodies are released from the conveyer 33 the fruit bodies, owing to the rearward and upward slope of the portion 32 of the submerging member, remain separated as the current forces them toward the discharge end of the submerging member. If the discharge portion 32 of the submerging member were level instead of aslant rearwardly and upwardly the fruit bodies would collect in a mass beneath the portion 32 owing to the friction against the portion 32, thus clogging the space beneath the portion 32 and causing interference between the fruit bodies at this point. The separating member also slants upward and rearward so as in the same manner to prevent clogging of the space beneath the separating member with fruit.

From the foregoing it is clear that provision is made for constant and uniform movement of the fruit bodies through the machine, positive means impelling the fruit part of the way and the current together with the great natural buoyancy of the fruit being relied upon at the separating point for constantly carrying the fruit rearward, the upward and rearward slant of the portion 32 and separating apron 48 and rods 51 being of great importance in aiding in the rearward movement of the fruit at the fruit separating point.

The invention is not limited in scope to the exact details of the construction described above and shown in the drawings except in so far as defined in the appended claims.

I claim:

1. A fruit separator comprising a tank adapted to contain liquid, means to create a current in said liquid, a submerged separating member within the tank, and means exclusive of the current to impel fruit from near the surface of the liquid to a lower level than the separating member and then release it.

2. A fruit separator comprising a tank adapted to contain liquid, means to create a circulation of the liquid, a separating member mounted within the tank, and means exclusive of the current to impel fruit from near the surface of the liquid to a lower level than the separating member and then release it.

3. A fruit separator comprising a tank adapted to contain liquid, means to create a circulation of the liquid in one direction, a separating member mounted within the tank, and means exclusive of the current to impel fruit from near the surface of the liquid to a lower level than the separating member and then release it.

4. A fruit separator comprising a tank adapted to contain liquid, means to create a current in said liquid, a submerging member extending aslant downward and rearward near the forward part of the tank, means extending beneath the submerging member to move the fruit toward the rear end of the submerging member, and means to separate the fruit bodies from one another according to their altitudes of rise.

5. A fruit separator comprising a tank adapted to contain liquid, means to create a current in said liquid, a submerged separating member, means to vertically adjust the separating member without changing the angle thereof, and means to submerge the fruit and release it at a point in advance of the separating member.

6. A fruit separator comprising a tank adapted to contain liquid, means to create a current in said liquid, a submerged separating member, a fruit submerging member mounted in advance of and inclined downwardly toward the separating member, said submerging member having its lower end located below the separating member and spaced from the bottom of the tank, and baffle plates in the tank in advance of the submerging member and inclined rearwardly and downwardly.

7. In a fruit separator, a tank adapted to contain a liquid, a submerged separating member mounted within the tank, means to create a current in the liquid, and positive means only to submerge all of the fruit and release it at a common submergence level in advance of the separating member.

8. A fruit separator comprising a tank to contain a liquid, a submerged separating member within the tank, means to conduct fruit into the tank, means to create a current in the liquid flowing from the point of entrance of the fruit into the tank toward the separating member, means exclusive of the current to submerge the fruit and release it at a point in advance of and below the level of the separating member, means to remove the fruit from the liquid and tank at a point above the level of the separating member, and means rearwardly of the separating member for removing fruit from the liquid and tank that has passed below the separating member.

9. A fruit separator comprising a tank adapted to contain a liquid, a separating member submerged in the liquid, means to create a current in the liquid, and means exclusive of the current for carrying all of the fruit downward in the liquid to a common level and releasing it.

10. A fruit separator comprising a tank adapted to contain a liquid, a separating member submerged in the liquid, means to create a current in the liquid, means including an endless conveyer extending below the level of the separating member to force the fruit downward toward the separating member, and means to operate the endless conveyer.

11. A fruit separator comprising a tank adapted to contain a liquid, a separating member submerged in the liquid, means to create a current in the liquid, means including an endless conveyer to force the fruit downward toward the separating member, said conveyer extending beneath the separating member, and means to operate the endless conveyer.

12. A fruit separator comprising a tank adapted to contain a liquid, a separating member submerged in the liquid, means to create a current in the liquid, a downwardly and rearwardly slanting submerging member, an endless conveyer extending beneath the submerging member and the separating member, and means to operate the endless conveyer.

13. A fruit separator comprising a tank adapted to contain a liquid, means to create a current in the liquid, a separating member submerged in the liquid, means to submerge and release fruit at a point in advance of the separating member, and means to raise and lower the separating member at all parts thereof equally.

14. A fruit separator comprising a tank adapted to contain a liquid, means to create a current in the liquid, a vertically adjustable support extending into the tank, means to shift the support horizontally, a separating member hung on the support, and means to submerge and release fruit at a point in advance of the separating member.

15. A fruit separator comprising a tank adapted to contain a liquid, means to create a current in the liquid, a vertically adjustable support extending into the tank, means to raise and lower the support, means to shift the support horizontally, a separating member hung on the support, and means to submerge and release fruit at a point in advance of the separating member.

16. A fruit separator comprising a tank adapted to contain a liquid, means to create a current in the liquid, vertically adjustable supports extending into the tank, screws to raise and lower said supports, means to turn all of the screws simultaneously, a separating member hung on the supports, and means to submerge and release fruit at a point in advance of the separating member.

17. A fruit separator comprising a tank adapted to contain a liquid, means to create a current in the liquid, vertically adjustable supports extending into the tank, slides shiftably mounted on the tank, means to shift the slides, screws mounted on the slides to raise and lower the supports, means to turn all of the screws simultaneously, a separating member hung from the supports, and means to submerge and release fruit at a point in advance of the separating member.

18. Means to hold a liquid, means to create a current in said liquid, means exclusive of the current to impel buoyant bodies of different specific gravities to a common level of submergence in said liquid, and means to receive the bodies of one specific gravity separate from the bodies of another specific gravity according to the angle of altitude of said bodies.

19. A fruit separator comprising a tank adapted to contain a liquid, means to create a current in the liquid, a separating member mounted in the tank, and means exclusive of the current to positively conduct the fruit to a common submerged level below the level of the separating member and there release it.

20. A fruit separator comprising a tank adapted to contain a liquid, a separating member in the tank, means to adjust the separating member up and down substantially on a level, means to release fruit from submergence at a certain level in the tank, and means to create a circulation of liquid in a direction from the last named means toward the separating member.

21. In a fruit separator, a tank for liquid, a separating member mounted within the tank, a submerging member mounted within the tank and releasing fruit from submergence, the separating member being movable toward and away from the submerging member, and means to create a circulation of the liquid from the submerging to the separating member.

22. In a fruit separator, a tank for liquid, a separating member mounted within the tank, a submerging member mounted within the tank and releasing fruit from submergence, said separating member being movable toward and away from the submerging member, means to create a circulation of the liquid from the submerging to the separating member, and means to vertically adjust said submerging member.

23. In a fruit separator, a tank to hold a liquid, a passage discharging into the tank at one end thereof, said passage at its discharge end being substantially of as great a width as the tank and said passage being gradually reduced in a direction away from the discharge end, a pipe connecting the smaller end of the passage with the opposite end of the tank, pumping means in the pipe, and means in the tank for separating fruit bodies of different specific gravities from one another.

24. In a fruit separator, a tank to hold a liquid, a passage discharging into the tank at one end thereof, said passage at its discharge end being substantially of as great a width as the tank and said passage being gradually reduced in a direction away from the discharge end, a pipe connecting the smaller end of the passage with the opposite end of the tank, pumping means in the pipe, means in the passage to retard the current created by the pump, and means in the tank for separating fruit bodies of different specific gravities from one another.

25. In a fruit separator, a tank to hold a liquid, a passage discharging into the forward end of the tank, said passage at its discharge end being substantially of as great a width as the tank and said passage being gradually reduced in a direction away from the discharge end, a pipe having a forwardly expanding discharge mouth connected with the smaller end of the passage, a perforated cone in said discharge mouth positioned with its pointed end directed rearward, the pipe being connected with the rear end of the tank, means in the pipe to circulate liquid, and means in the tank for separating fruit bodies of different specific gravities from one another.

26. In a fruit separator, a tank to hold a liquid, a passage discharging into the forward end of the tank, said passage at its discharge end being substantially of as great a width as the tank and said passage being gradually reduced in a direction away from the discharge end, a pipe connected with the smaller end of the passage, spaced zigzag shaped baffles positioned lengthwise in the passage, the pipe being connected with the rear of the tank, means in the pipe to circulate liquid, and means in the tank for separating fruit bodies of different specific gravities according to their altitudes of rise.

27. In a fruit separator, a tank to hold a liquid provided with a port in one side, a cover for the port, a passage beneath the tank discharging into the forward end of the tank, a well in the bottom of the passage adjacent the port, a screen extending across the passage adjacent the well, a pipe connecting the rear end of the passage with the rear of the tank, means in the pipe to circulate liquid, and means in the tank for separating fruit bodies of different specific gravities from one another according to their altitudes of rise.

28. In a fruit separator, a tank to hold a liquid, a passage beneath the tank discharging into the forward end of the tank and gradually reduced rearward, said passage at its discharge end being substantially of as great a width as the tank, a pipe connected with the smaller end of the passage and connected with the rear of the tank, means in the pipe to circulate liquid, a screen extending the full width of the passage near the larger end thereof, and means in the tank for separating fruit bodies of different specific gravities from one another according to their altitudes of rise.

29. In a fruit separator, a tank adapted to contain a liquid, a submerged separating member mounted within the tank, means to create a current in the liquid, positive means to submerge all of the fruit and release it at a common level of submergence in advance of the separating member, and a series of downwardly and rearwardly inclined baffle plates mounted in the tank in advance of the submerging member.

Signed at Los Angeles, California, this 26th day of June, 1918.

HUGH H. JACKSON.

Witnesses:
GEORGE H. HILES,
L. BELLE WEAVER.